(12) United States Patent
Squillante

(10) Patent No.: US 8,841,531 B2
(45) Date of Patent: Sep. 23, 2014

(54) SHEET MUSIC HOLDER AND METHOD FOR PLAYING AN INSTRUMENT

(71) Applicant: Charles Edward Squillante, Wyckoff, NJ (US)

(72) Inventor: Charles Edward Squillante, Wyckoff, NJ (US)

(*) Notice: Subject to any disclaimer, the term of this patent is extended or adjusted under 35 U.S.C. 154(b) by 0 days.

(21) Appl. No.: 13/815,389

(22) Filed: Feb. 27, 2013

(65) Prior Publication Data
US 2014/0238217 A1 Aug. 28, 2014

(51) Int. Cl.
*G10D 13/02* (2006.01)
*G09B 15/02* (2006.01)

(52) U.S. Cl.
CPC ............... *G09B 15/02* (2013.01); *G10D 13/02* (2013.01)

USPC .......................................... 84/411 R

(58) Field of Classification Search
USPC ................................. 84/411 R, 421
See application file for complete search history.

(56) References Cited

U.S. PATENT DOCUMENTS 3,437,002 A * 4/1969 Defauw et al. .................. 84/453
4,225,107 A * 9/1980 Gleason ........................ 248/443
5,520,462 A * 5/1996 Clark .............................. 383/37

* cited by examiner

*Primary Examiner* — Kimberly Lockett
(74) *Attorney, Agent, or Firm* — Edward A. Squillante, Jr.

(57) ABSTRACT

A sheet music holder for a drum kit is described. The sheet music holder is suitable to provide sheet music to a drum head so that music may be read when the drum is played. The sheet music holder preserves the condition of the sheet music and is suitable to dampen the sound of the drum it is placed on.

20 Claims, 4 Drawing Sheets

US 8,841,531 B2

SHEET MUSIC HOLDER AND METHOD FOR PLAYING AN INSTRUMENT

FIELD OF THE INVENTION

The present invention is directed to a sheet music holder and a method for playing an instrument. More particularly, the present invention is directed to a sheet music holder for holding sheet music to the skin or head of a drum, and a method for playing the drums.

BACKGROUND OF THE INVENTION

It is known that many music students, especially young music students, are in a hurry to play popular and "hip" songs on their instrument before learning the appropriate basics. In fact, many music students and music teachers have disagreements when the student wants to quickly learn songs and play, for example, by ear, and the teacher wishes to review musical theory, music reading and the art of playing an instrument while simultaneously reading sheet music.

When playing classical music, for example, music students tend to be very serious and typically try to play their instruments while reading sheet music. Sheet music may be placed on a conventional music stand and is generally easy to read and manipulate (i.e., turn pages) when playing instruments like the piano, a wind instrument or even an instrument with strings.

Drummers, on the other hand, are often found memorizing music (which can be very difficult, and especially, for early stage musicians) or they have to play by ear. This is true because drummers have a stick in each hand, pedals associated with the feet and are typically moving very fast on a drum set or kit that is quite large, even at the beginner level. Thus, getting sheet music accessible to a drummer which is easy to read and manipulate can be very difficult.

There is an increasing interest to develop a sheet music holder that is suitable for use with drummers, and especially, young drummers. This invention, therefore, is directed to a sheet music holder and a method for playing the drums. The sheet music holder is one which is suitable to hold sheet music to the skin or head of a drum whereby such a sheet music holder, unexpectedly, allows a musician to play the drums while reading sheet music placed on at least one skin or head of a drum within the set or kit of the drummer without destroying the sheet music.

ADDITIONAL INFORMATION

Efforts have been disclosed for making music stands. In U.S. Pat. No. 4,360,183, a retaining device for sheet music is described.

Other efforts have been disclosed for making music stands. In U.S. Pat. No. 4,225,107, a music holder for a drum is described.

Still other efforts have been disclosed for making music stands. In U.S. Published Patent Application No. 2008/0116337A1, a music stand and article retaining apparatus are described.

None of the additional information above describes a sheet music holder and method for playing the drums as described in this invention, and particularly where, for example, sheet music is associated with a sheet music holder on the skin or head of a drum and easily accessible to a drummer.

SUMMARY OF THE INVENTION

In a first aspect, the present invention is directed to a sheet music holder suitable for use by a drummer and attachable to the skin or head of a drum.

In a second aspect, the present invention is directed to a drum kit comprising the sheet music holder of the first aspect of the invention.

In a third aspect, the present invention is directed to a method for playing drums with the sheet music holder of the first aspect of this invention.

All other aspects of the present invention will more readily become apparent upon considering the detailed description, figures, and examples which follow.

Skin, as used herein, is meant to mean the portion of the drum that the drummer typically hits with his or her drum sticks. Skin, therefore, may be used interchangeably with drum head. Attachable, as used herein, is meant to mean stabilized on or stabilized and connectable to some portion of a drum head and/or drum (i.e., such as drum rim or tension rods) and removable and reusable. Attachable, therefore, is meant to include associated with such that the sheet music holder does not fall off while playing. Drum, as used herein, means an instrument with a body (hollow) and at least a top skin but preferably a top and bottom skin. The drum head or skin is typically attached to a drum hollow body with brackets screwed via tension rods into a tension rod receptor on the side of the body. Not continuously sealing means leaving a mouth and pocket for sheet music insertion therein. Drum set or kit, as used herein means the collection of drums, cymbals and hardware assembled by a drummer. The same are commercially available and sold, for example, under the names Pearl®, DW®, TAMA®, and ddrum®. Rec-Circular™, as used herein, means looking rectangular on opposite sides and semi-circular on opposite sides of a four sided object as depicted in FIG. 1.

Unless explicitly stated otherwise, all ranges defined herein are meant to include all ranges subsumed therein. Comprising is meant to include consisting essentially of and consisting of. For example, a sheet music holder comprising sheet music inserted therein is meant to provide support for a sheet music holder consisting essentially of or consisting of sheet music inserted therein.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
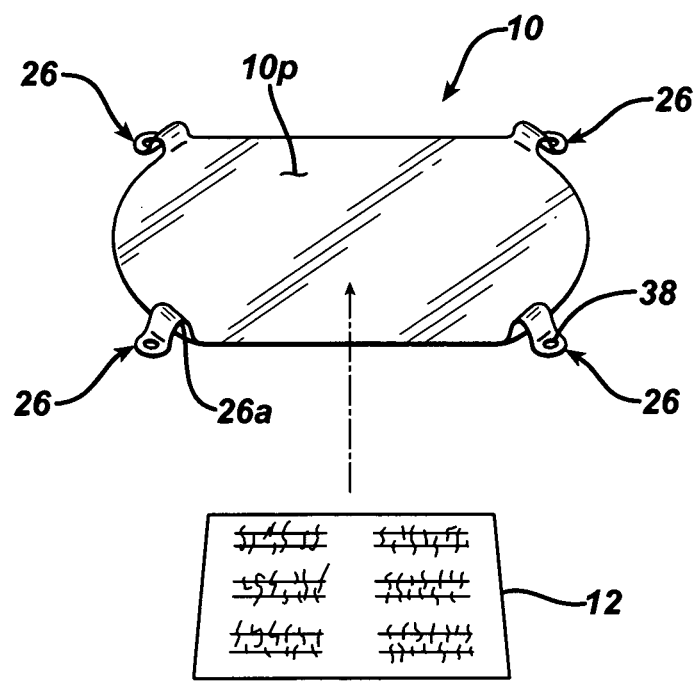
FIG. 1 depicts the sheet music holder of this invention and sheet music.
Figure 2:
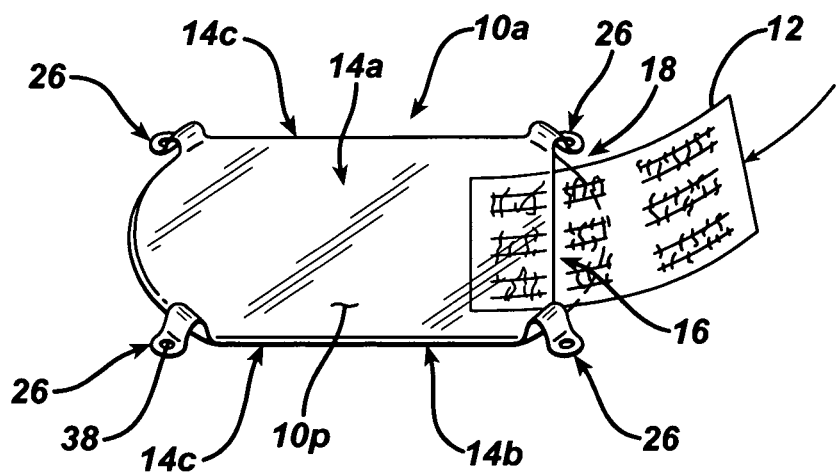
FIG. 2 depicts the sheet music holder of this invention having a pocket therein.
Figure 3:
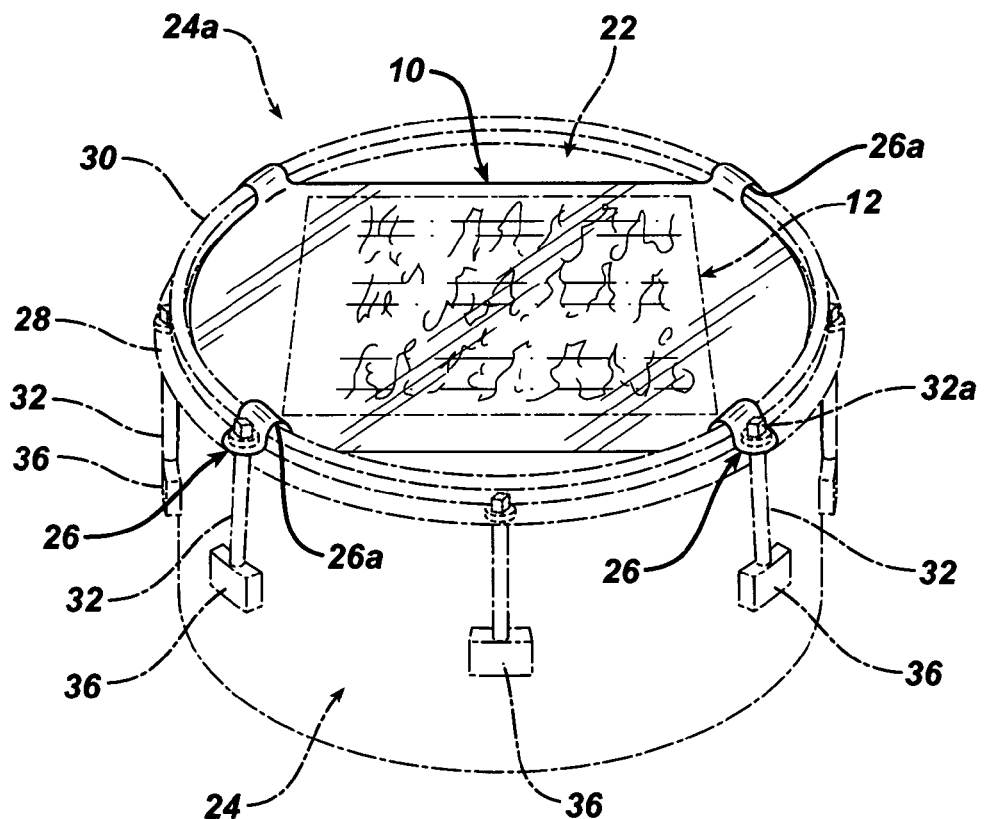
FIG. 3 depicts the sheet music holder of this invention fitted onto a drum.

Turning to FIG. 1, shown is an illustrative perspective view of a sheet music holder 10 (Rec-cirular™ in shape) and capable of covering sheet music 12. The sheet music holder 10 is one which is at least translucent, but preferably, transparent. The sheet music holder 10 may be a single sheet itself (e.g., plastic or rubber) or sheet music holder 10a may optionally, as shown in FIG. 2, comprise two sheets 14a and 14b to form a sheet music holder pouch or pocket 16 having a mouth or opening 18 in which sheet music 12 may be inserted completely therein (not shown). The sheet music holders, 10 and 10a should be large enough to cover substantially all of the sheet music (i.e; preferably, at least 90%, and most preferably, 100% of the sheet music 12) so that the sheet music 12 is not damaged or torn during use by a drummer. While suitable to cover substantially all of the sheet music 12, the sheet music holders 10 and 10a should not be of a size where they do not fit on top of drum head 22 as shown in FIG. 3. In the case of sheet music holder 10, the same optionally may be placed in a photocopy machine for sheet music to be photocopied thereon (not shown) thereby eliminating the need for sheet music 12 to be placed thereunder. Such a sheet music holder 10 may be written on (not shown) with preferably erasable ink so that the musician can write music on the same while having the option to clean and use the sheet music holder 10 again and with new or different music. In the optional case when the sheet music holder comprises two sheets (as shown with sheet music holder 10a), sheet music 12 fits within the sheet music pouch or pocket 16. In a most preferred embodiment, and again, all of the sheet music (i.e., 100%) is covered by the sheet music holders 10 and 10a. Illustrated and depicted in FIG. 2 is sheet music holder 10a comprising top sheet 14a and bottom sheet 14b. Top sheet 14a and bottom sheet 14b are associated with each other such that the same are substantially the same size and placed directly on top of each other for sealing along their perimeter 14c. The sealing along the perimeter 14c should not be continuous (i.e., 100%) so that the sheet music may be inserted therein and to allow for the formation of the pocket 16 and mouth 18. Sealing may be achieved with conventional means, including those that use adhesives and heat sealing techniques. Where sealing does occur, it is preferable continuous to prevent movement of the sheet music 12 (but not completely continuous to prevent pouch or pocket 16 formation). It is within an option of this invention, however, for sealing along the perimeter 14c to be non-continuous (e.g. periodic sealing sections) but distinct enough to leave a defined pocket 16 and mouth 18. Sealing along the perimeter 14c of sheet music holder 10a at perimeter 14c is preferably less than about 1.5 cm, and most preferably, from about 0.1 to about 0.75 cm in width (from the edge of the sheet music holder 10a), including all ranges subsumed therein.

There is no limitation with respect to the shape the sheet music holders 10 and 10a may take on other than that they can fit on top of a drum head 22 mounted on a drum body 24 of a drum 24a as depicted in FIG. 3. Therefore, the sheet music holders 10a and 10b of this invention may, for example, be square, triangular, rectangular, circular or Rec-cirular™. In a preferred embodiment, the sheet music holders 10 and 10a of this invention are Rec-cirular™ or round, and most preferably, Rec-cirular™.

The only limitations with respect to the material used to make the sheet music holders 10 and 10a of this invention are that the material is safe, easy for a drummer to use, and suitable to cover sheet music 12 while simultaneously allowing the drummer to read the sheet music. Often, the sheet music holder (10 or 10a) is made of a polymeric material including those like polyethylene, polypropylene, polyester (e.g., polyethylene terephthalate), polycarbonate, mixtures, blends or copolymers thereof (or the like). Materials, therefore, referred to as Mylar and Cellophane may be used. In cases where the drummer lives in a city or an apartment, the sheet music holder 10 or 10a can be designed to dampen or diminish the volume of the drum as it is hit with drumsticks 42. In a most preferred embodiment, such holders are made of polyester. In a desired embodiment, sheet music holder 10 and sheets 14a and 14b of sheet music holder 10a are from about 0.04 to about 18 mm thick, and preferably, from about 0.05 to about 8 mm thick, and most preferably, from about 0.06 to about 1 mm in thickness, including all ranges subsumed therein. In another desired embodiment, and particularly as it relates to sheet music holder 10a, bottom sheet 14b is equal in thickness to 30 times, and preferably, equal in thickness to 20 times, and most preferably, equal in thickness to 5 times the thickness of top sheet 14a. In an often preferred embodiment, bottom sheet 14b should be thicker than top sheet 14a when it is desired to dampen the sound of the drums. In an especially desired embodiment, sheet music holder 10 and sheet music holder 10a are from 0.07 to about 0.7 mm thick, including all ranges subsumed therein.

In operation, sheet music 12 is photocopied onto sheet music holder 10 or sheet music 12 is placed on the drum head 22 as shown in FIG. 3 and covered by sheet music holder 10. In the case of sheet music holder 10a, sheet music may be placed in pocket (or pouch) 16 of the sheet music holder 10a as depicted in FIG. 2. To stabilize sheet music 12 on drum head 22, electrostatic forces may hold the sheet music holders 10 and 10a in place. Preferably, non-permanent adhesive like, for example, the adhesive seen on "sticky" yellow note papers may be used to secure sheet music holders 10 and 10a in place on the drum head. When used, such non-permanent adhesive (such as a low tack pressure sensitive adhesive) is placed preferably at the corners of the holders and usually occupying from about 0.1 to about 8 cm$^2$ of surface area in each of the corners of the sheet music holders 10 and 10a. In a most preferred embodiment, sheet music holders 10 and 10a may comprise sheet music holder tabs 26 that can be inserted over drum rim 30 of drum bracket 28 which is mounted to the drum body 24 via tension rods 32 (typically threaded) and inserted through holes 34 in the drum bracket 28 that are received by rod receptors 36 found on the exterior of the drum body 24 (as depicted in FIG. 3).

Figure 4:
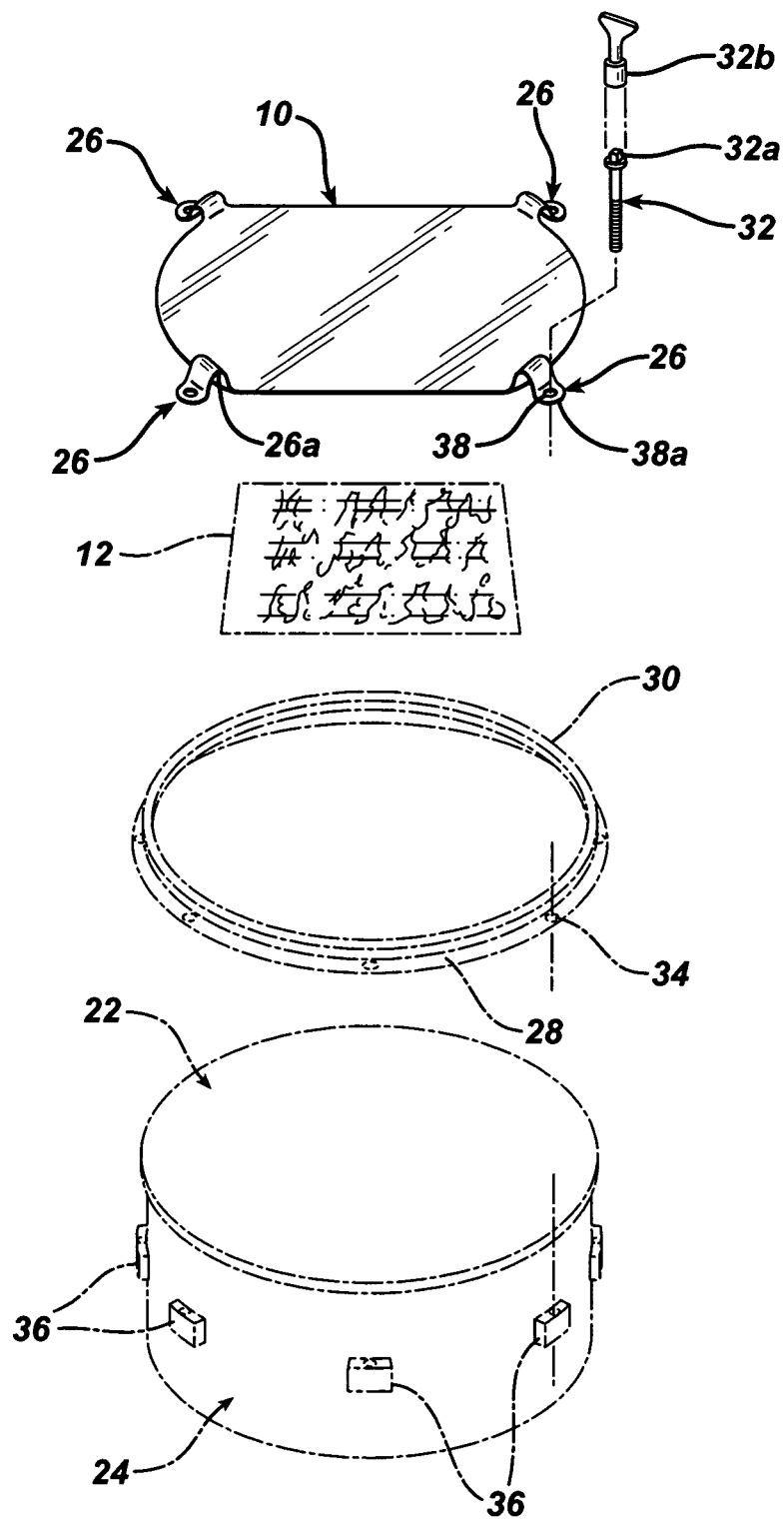
FIG. 4 depicts an assembly scheme with the sheet music holder of this invention.

Holder tabs 26 preferably having a hairpin-type bend 26a that preferably are flexible to bend (also to aid in manipulation into a photocopy machine) so that sheet music holders 10 and 10a fit in the plane of the drum head (i.e., on top of) and not perpendicular or at an angle thereto. Such holder tabs 26 comprise an orifice 38 in a tab foot 38a (as shown in FIG. 4) so that tension rod head 32a can penetrate through orifice 38 for holding the sheet music holders 10 and 10a in place. When holder tabs 26 with orifice 38 are placed over tension rod head 32a for insertion therein, rod caps 32b (as shown in FIG. 4) may preferably be used for insertion on to tension rod heads 32a to ensure that sheet music holders 10 and 10a remain in place. In a desired embodiment and when looking at a side-view of sheet music holders 10 and 10a, planar surface 10p for music holders 10 and 10a is higher than the tab feet 38a on such holders.

Figure 5:
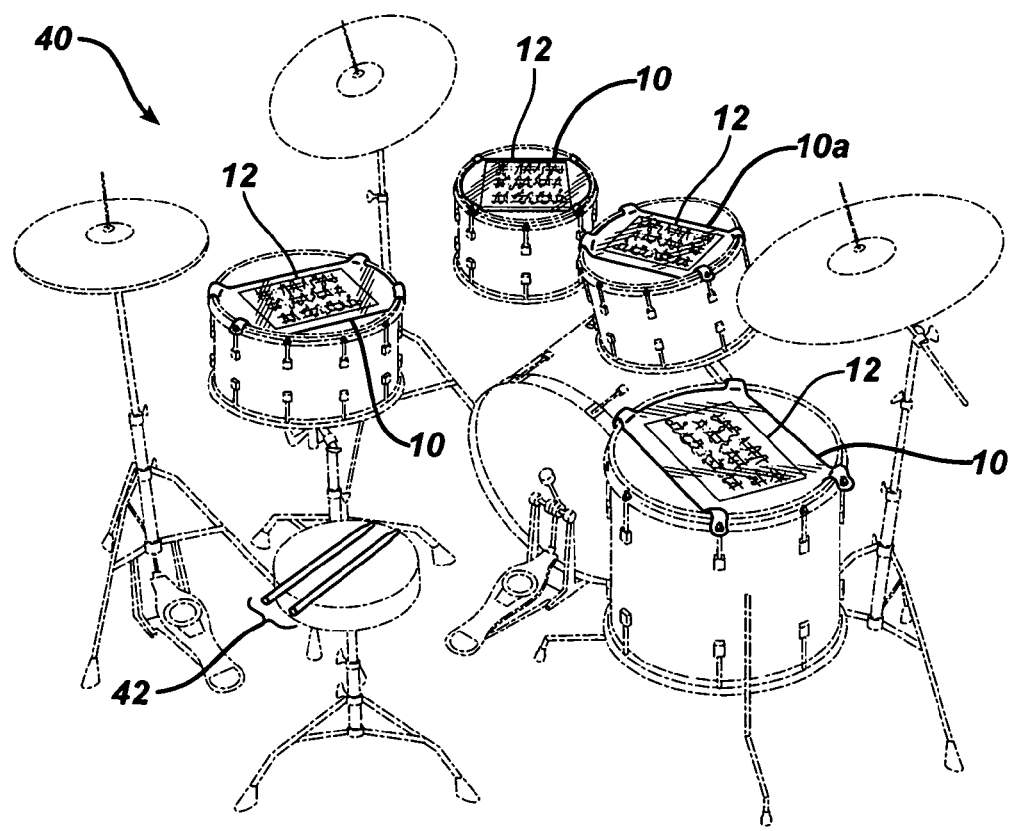
FIG. 5 depicts sheet music holders of this invention fitted on to a drum kit.

When utilizing sheet music holders 10 and 10a of the present invention, sheet music 12 may be placed under (if not photocopied thereon) sheet music holder 10, or in as is the case for sheet music holder 10a. The same should be associated with the drum kit 40 as described (and shown in FIG. 5) and the drummer can then visibly view sheet music 12 when playing (preferably reading from left to right on the drum kit 40). The sheet music holders 10 and 10a of the present invention may be sold in packages with many sizes to fit the different size drums 24a found in a conventional drum set 40 (often having drums with diameters from about eight (8) cm to about sixty (60) cm. As illustrated in FIG. 5, drums within the drum kit 40 may be fitted with the holders (10 and/or 10a)

of this invention with sheet music 12 displayed in plain view for the drummer to read. When playing drums of the drum kit 40, the drummer, not shown, would be instructed to hit the drums as if nothing (i.e. no music) was being displayed thereon. The sheet music holders of this invention can have essentially little to no effect on the sound of the drums when hit with drum sticks 42 and will aid the drummer such that he or she can play the instrument with music or sheet music 12 conveniently displayed for reading. Again, the thickness of the sheet music holders is limited to the extent that the drummer wishes to effect the volume or the sound of the drums while practicing. As previously stated, the thickness of the holders may be increased in order to silence the sound of the drums. Such a feature is typically desired when practicing in a home close to neighbors or an apartment. Again, when using sheet music holder 10a, bottom sheet 14b could be made thicker than top sheet 14a to ensure that sheet music 12 remains visible through top sheet 14a and bottom sheet 14b deadens or silences the sound of the drum it is fitted on. It should be understood that there is no limitation with regard to how many sheet music holder tabs 26 are formed on the sheet music holders of this invention. Enough should be present to secure positioning of the sheet music 12. Typically 1-6 are desired, and preferably, 2 to 4 sheet music tabs 26 are included. The shapes and number of tabs described herein can be altered with manufacturing modifications which include molding, pressing and/or cutting manipulations. The hairpin-type bends 26a can be made, for example, with bending and/or crimping techniques with or without heating.

Experiment

A polyester sheet music holder 10 (dimensions about 25 cm×26 cm, 0.5 mm thick) was placed over sheet music 12 placed on a snare drum of a drum kit 40. Sheet music holder tabs 26 at each corner of the music sheet holder 10 were placed over drum rim 30 of drum bracket 28 and orifices 38 were placed over tension rod heads 32a and secured with rod caps 32b to secure the sheet music 12 under the sheet music 10 holder. A snare beat was played by a drummer consistent with the music on the sheet music 12 placed under the sheet music holder 10. The sheet music 12 was not damaged, the sheet music holder 10 was not damaged and left in re-useable form. The snare beat was repeated without the sheet music holder 12 of this invention and with a third party holding the sheet music 12 for the drummer. The beat played sounded essentially the same as the beat played when using the sheet music 12 with sheet music holder 10 of this invention.

What is claimed is:

1. A sheet music holder for a drummer comprising:
  (a) a transparent or translucent sheet for covering sheet music on a drum head of a drum; and
  (b) a means for attaching the sheet music holder to the drum head of the drum
wherein the sheet music holder is one which is placed on the drum head of the drum and hit with a drum stick.

2. The sheet music holder according the claim 1 wherein the sheet music holder comprises a top sheet and bottom sheet which form a pocket and mouth for insertion of the sheet music.

3. The sheet music holder according to claim 1 wherein the sheet music holder does not dampen sound produced by the drum.

4. The sheet music holder according to claim 1 wherein the sheet music holder silences sound produced by the drum.

5. The sheet music holder according to claim 2 wherein the sheet music holder does not dampen sound produced by the drum.

6. The sheet music holder according to claim 2 wherein the bottom sheet is thicker than the top sheet and the sheet music holder silences sound produced by the drum.

7. The sheet music holder according to claim 1 wherein the sheet music holder is a transparent polymer.

8. The sheet music holder according to claim 2 wherein the sheet music holder is a transparent polymer.

9. The sheet music holder according to claim 1 wherein the sheet music holder comprises tabs with an orifice for insertion onto a tension rod head of a drum tension rod.

10. The sheet music holder according to claim 2 wherein the sheet music holder comprises a tab with an orifice for insertion onto a tension rod head of a drum tension rod.

11. The sheet music holder according to claim 1 wherein the sheet music is photocopied onto the sheet music holder.

12. The sheet music holder according to claim 1 wherein the sheet music holder is packaged with sheet music holders of varying sizes.

13. The sheet music holder according the claim 2 wherein the sheet music holder is packaged with sheet music holders of varying sizes.

14. The sheet music holder according to claim 1 wherein the means for attaching the sheet music holder includes tabs with a hairpin bend, electrostatic forces or non-permanent adhesive.

15. A drum kit comprising the sheet music holder of claim 1.

16. A method of playing drums comprising the steps of:
  (a) placing a sheet music holder covering sheet music or having sheet music written or photocopied thereon onto a drum head of a drum; and
  (b) hitting the sheet music holder with a drum stick.

17. The method of playing drums according to claim 16 wherein the sheet music holder is square, rectangular, or circular is shape.

18. The method of playing drums according to claim 16 wherein the sheet music holder does not dampen the sound of the drum after being hit with a drum stick.

19. The method of playing drums according to claim 16 wherein the sheet music holder silences sound produced by the drum after being hit with a drum stick.

20. The method for playing drums according to claim 16 wherein the sheet music holder is from about 0.07 to about 0.7 mm thick.

* * * * *